(12) United States Patent
Pinto et al.

(10) Patent No.: US 8,161,492 B2
(45) Date of Patent: Apr. 17, 2012

(54) CONTINUATION BASED RUNTIMES IN TRANSACTIONS

(75) Inventors: Edmund Samuel Victor Pinto, Duvall, WA (US); Kenneth David Wolf, Seattle, WA (US); Robert Brian Schmidt, Woodinville, WA (US); Nathan C. Talbert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 12/103,639

(22) Filed: Apr. 15, 2008

(65) Prior Publication Data

US 2009/0260009 A1   Oct. 15, 2009

(51) Int. Cl.
*G06F 9/445* (2006.01)
(52) U.S. Cl. ........................................ 718/106; 719/313
(58) Field of Classification Search ........................ None
See application file for complete search history.

(56) References Cited

U.S. PATENT DOCUMENTS

| | | | | |
|---|---|---|---|---|
| 5,903,891 A * | 5/1999 | Chen et al. | ............................. | 1/1 |
| 6,009,405 A * | 12/1999 | Leymann et al. | ............. | 705/7.27 |
| 6,119,145 A | 9/2000 | Ikeda et al. | | |
| 7,805,325 B2 * | 9/2010 | Rits et al. | ...................... | 705/7.26 |
| 7,805,327 B1 * | 9/2010 | Schulz et al. | ................ | 705/7.26 |
| 2002/0184616 A1 * | 12/2002 | Chessell et al. | ............... | 717/132 |
| 2004/0008678 A1 * | 1/2004 | Matthews et al. | ............. | 370/389 |
| 2005/0093881 A1 * | 5/2005 | Okita et al. | .................... | 345/589 |
| 2005/0171930 A1 * | 8/2005 | Arning et al. | ..................... | 707/2 |
| 2005/0262182 A1 | 11/2005 | Thole | | |
| 2006/0074714 A1 | 4/2006 | Aziz et al. | | |
| 2006/0074736 A1 * | 4/2006 | Shukla et al. | ..................... | 705/8 |
| 2006/0136279 A1 * | 6/2006 | Maybee et al. | .................. | 705/9 |
| 2006/0277024 A1 | 12/2006 | Kloppmann et al. | | |
| 2007/0150509 A1 | 6/2007 | Lev et al. | | |
| 2007/0156888 A1 * | 7/2007 | Hilerio et al. | ................. | 709/224 |
| 2007/0233969 A1 | 10/2007 | Shukla et al. | | |
| 2007/0239505 A1 | 10/2007 | Shukla et al. | | |
| 2008/0052725 A1 * | 2/2008 | Stoodley et al. | .............. | 718/107 |

OTHER PUBLICATIONS

Transactional Support for Inter-Task Co-Ordination within Long-Lived Distributed Applications (6 pages) http://hpts.ws/papers/1999/Shrivastava.htm.
Introduction to Hosting Windows Workflow Foundation (9 pages) http://msdn2.microsoft.com/en-us/library/aa663362.aspx#hostingwwf_topic5, 2007.
A Transaction-Oriented Workflow Activity Model (8 pages) http://www.pri.univie.ac.at/Publications/1994/Eder_A_Transaction_Oriented_Workflow_Activity_Model.pdf.

* cited by examiner

*Primary Examiner* — Eric Coleman
(74) *Attorney, Agent, or Firm* — Workman Nydegger (57) ABSTRACT

A continuation based runtime participates in transactions that are not generated by the continuation based runtime, but rather are generated externally to the continuation based runtime. The continuation based runtime marshals in transaction data related to the pre-existing externally generated transaction. In one embodiment, the continuation based runtime itself may not do this, but perhaps may use a transaction enabled activity. Once the activity marshals in the data, the activity may request that the continuation based runtime enlist in the transaction, whereupon the continuation based runtime may then register and the transaction may be performed in the context of the continuation based runtime.

16 Claims, 5 Drawing Sheets

CONTINUATION BASED RUNTIMES IN TRANSACTIONS

BACKGROUND

One type of software is referred to as a "runtime". A runtime provides underlying functionality that can be used by multiple applications that run on a computing system. One distinct type of runtime is called a "continuation based runtime". A continuation based runtime executes activities. An activity represents a unit of executable code that consists of multiple pulses of work. For instance, suppose an activity is to receive messages. In that case, one pulse of work might be to set up the computing system with proper configuration and state to receive messages, and then pause until a message is received. Another pulse of work might occur when a message is received, which might involve setting up the message so that data can be extracted from the message. Another pulse of work might be to extract the data from the message itself, and so forth. In between pulses the runtime may generate a continuation, allowing for an appropriate pause.

One of the ways an activity can execute multiple pulses of work is through the scheduling of child activities. This composition of activities enables custom control flows that can be implemented through the scheduling of child activities 0, 1 or n times as determined by the composite activity. Beyond this flexibility to create new control flows, activities in a continuation based runtime have a number of distinct characteristics. For instance, such activities have no process affinity in that they can be paused in one process, and resumed in a different process, and may also run on different threads. Such activities can also be persisted into persistent storage for later rehydration back into memory.

Continuation based runtimes are capable of initiating and managing transactions. However, continuation based runtimes are much more difficult, if not impossible, to be incorporated in transactions that are generated outside of the continuation based runtime, at least not without the guarantees of atomicity, consistency, isolation, and durability expected for a transaction.

BRIEF SUMMARY

Embodiments described herein allow a continuation based runtime to participate in transactions that are not generated by the continuation based runtime, but rather are generated externally to the continuation based runtime. The continuation based runtime marshals in transaction data related to the then-existing externally generated transaction. In one embodiment, the continuation based runtime itself may not do this, but perhaps may use a transaction enabled activity. Once the activity marshals in the data, the activity may request that the continuation based runtime enlist in the transaction, whereupon the continuation based runtime may then enlist in with the transaction. The activity or the continuation based runtime may then perform a portion of the transaction.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a continuation based runtime is permitted to participate in a transaction that was not initiated by the continuation based runtime itself. First, some introductory discussion regarding a computing system in which the principles described herein may be employed will be described with respect to FIG. 1. Then, the basic principles of a continuation based runtime will be described with respect to FIGS. 2 and 3. Then, the use of a continuation based runtime to perform a part of an externally generated transaction will be described with respect to FIGS. 4 and 5, with brief reference again to FIG. 2.

Figure 1:
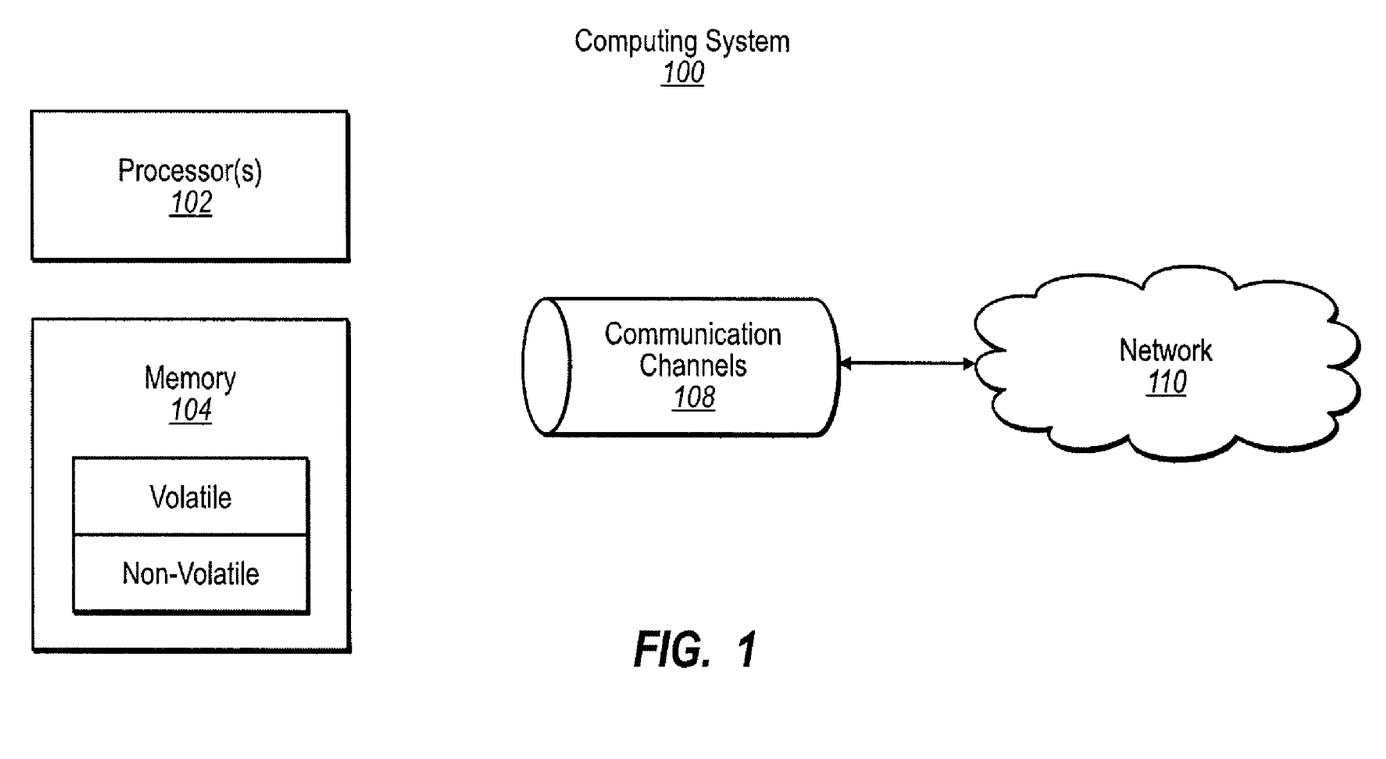
FIG. 1 illustrates an example computing system that may be used to employ embodiments described herein.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-deliver media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter as defined in the appended claims is not necessarily limited to the specific features or acts described herein. Rather, the specific features and acts described herein are disclosed as example forms of implementing the claims.

Figure 2:
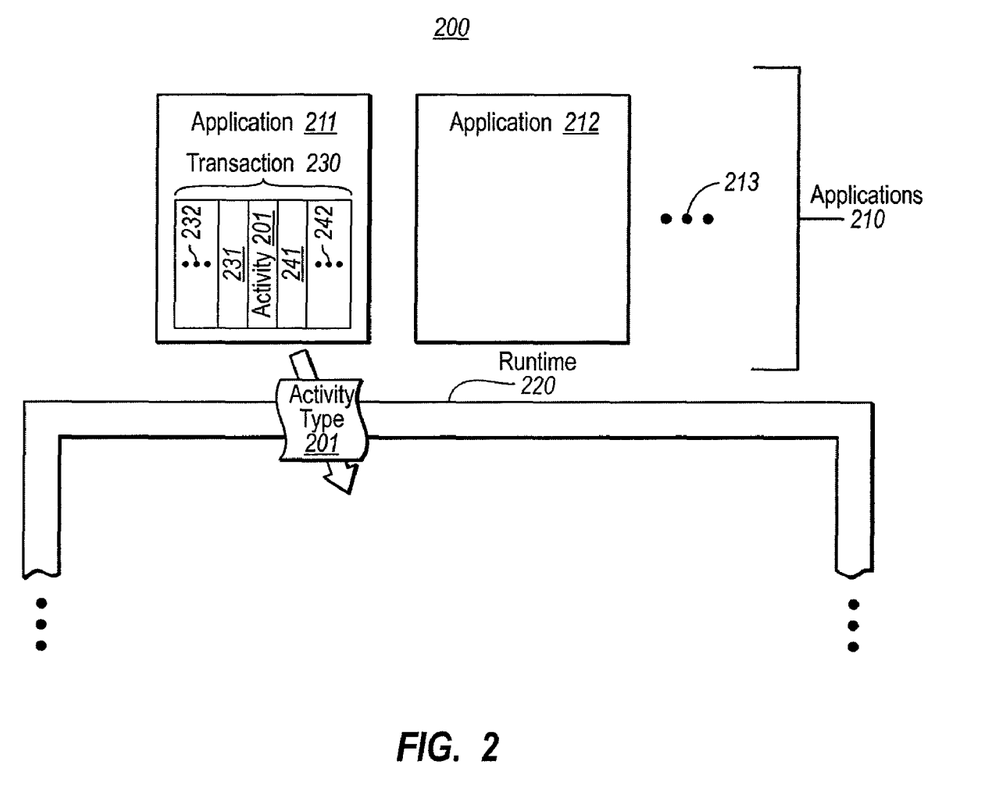
FIG. 2 schematically illustrates a software architecture and process flow associated with the use of a continuation based runtime.

A runtime is software functionality that provides services to applications that run on a computing system. For instance, FIG. 2 illustrates a software architecture 200 for various components running on a computing system, such as the computing system 100 of FIG. 1. The software architecture 200 includes applications 210 that take advantage of the functionality provided by runtime 220. The applications 210 may include any number of applications. However, in the example of FIG. 2, the applications 210 are shown as including application 211, and application 212. However, the horizontal ellipses 213 symbolically represents that any number, one or more, of applications may be running and taking advantage of the services of the underlying runtime 220.

In one embodiment, the runtime 220 may be a continuation based runtime. A continuation based runtime performs pulses of work in the form of activities. Such activities are provided from one of the applications 210. For instance, application 211 is illustrated as providing activity 201 to the runtime 220. Each activity may be hierarchically structured such that parent activities may include 0, 1 or more child activities of a given type. In a continuation based runtime, an activity may place a continuation, which basically pauses the activity. At some later point, the activity may be resumed.

Figure 3:
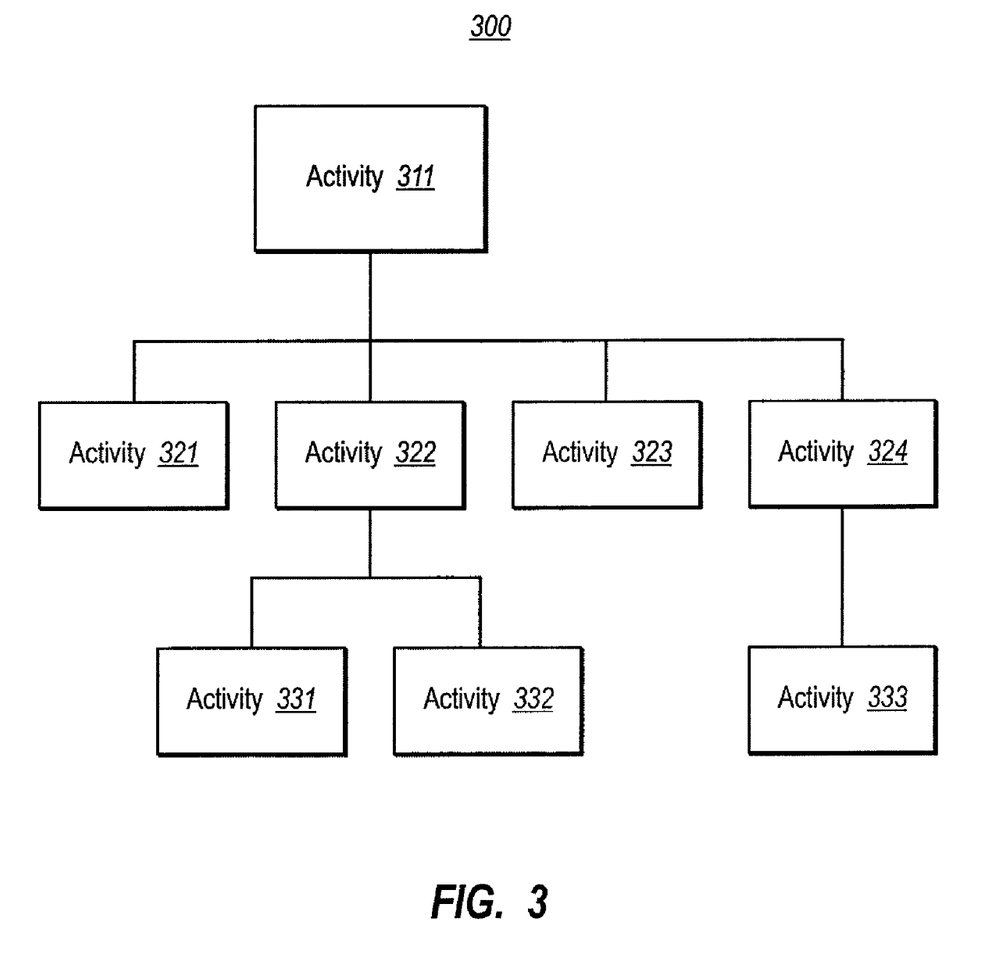
FIG. 3 schematically illustrates an example activity that is structured hierarchically with child activities.

FIG. 3 schematically illustrates an example of such a hierarchically structured activity 300. The parent activity 311 includes child activities 321, 322, 323 and 324. The child activity 322 has its own child activities 331 and 332. The child activity 324 includes its own child activity 333. A parent activity is not completed as until all of its child activities (or at least those child activities that are to be performed) are completed, and the parent activity otherwise completes its own work. Thus, in executing the parent activity 311, at least a subset of the various nodes of the tree 300 are navigated.

Referring to FIG. 2, one of the applications 211 is managing a transaction 230. A transaction includes one or more acts that are either all to be performed, or none are performed and thus is a reliable mechanism for moving from one state to another. If a problem occurs in the midst of the transaction, the transaction may be rolled back to the pre-transaction state reflecting that none of the acts of the transaction are durably performed.

The transaction 230 is initiated outside of the continuation based runtime 220. However, the transaction 230 still includes an activity 201 that is to be executed within the continuation based runtime 220. Still, there may be actions 231 within the transaction 230 that are performed prior to enlisting the services of the continuation based runtime. The horizontal ellipses 232 represents there may be zero, one, or more actions performed atomically as part of the transaction 230 even prior to the continuation based runtime 220 executing the activity 201. The transaction also includes actions 241 within the transaction 230 that are performed after the continuation based runtime has executed the activity 201. The horizontal ellipses 242 represents that there may be zero, one or more such actions performed as part of the transaction 230 outside of the continuation based runtime 220 even after the runtime 220 executes the activity 201.

Accordingly, the principles described herein allow a continuation based runtime to participate in a transaction that was generated outside of the context of the continuation based runtime. This allows for flexible composition of a transaction where one or more actions of the transactions may occur outside of a continuation based runtime, and one or more actions of the transaction may occur inside of the continuation based runtime. Thus, a more flexible transaction composition mechanism is enabled where the actions performed as part of the transaction are distributed across the boundaries of the continuation based runtime.

Figure 4:
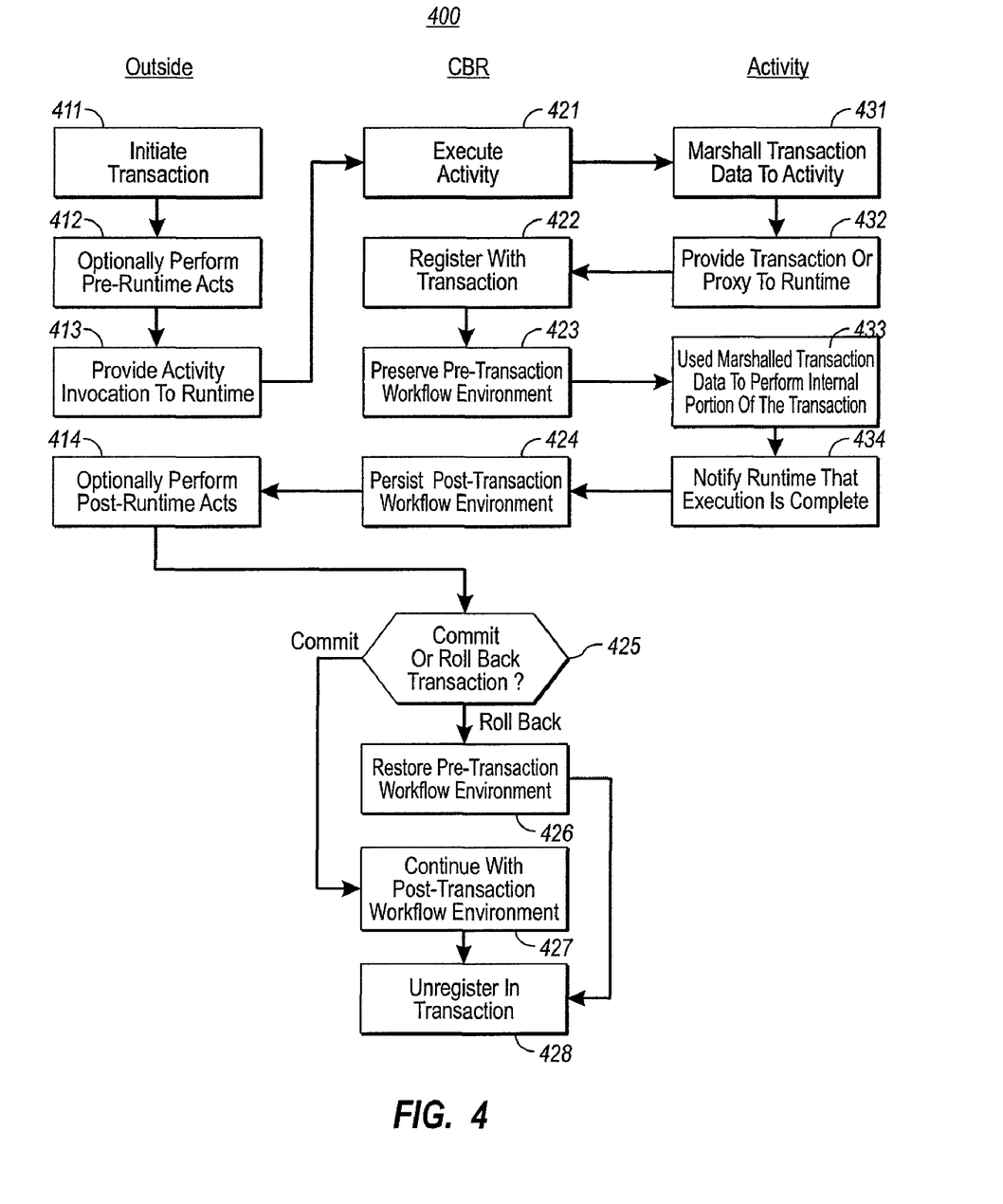
FIG. 4 illustrates a flowchart of a method for the performing a transaction that was generated outside of a continuation based runtime using the services of the continuation based runtime to perform a portion of the transaction.

FIG. 4 illustrates a flowchart of method 400 for allowing the continuation based runtime to participate in a transaction without having generated the transaction. Although not required, the method may be performed by, for example, the computing system 100 of FIG. 1 upon the processors 102 processing computer-executable instructions carried on one or more computer-readable media. Some of the acts of the method 400 are performed outside of the continuation based runtime as included in the left column of FIG. 4 under the heading "Outside". Others of the acts are performed by the continuation based runtime as expressed in the middle column of FIG. 4 under the heading "CBR". Other acts are performed by an activity running within a workflow of the continuation based runtime as included in the right column of FIG. 4 under the heading "Activity".

The method 400 begins with the initiation of the transaction (act 411), which is performed outside of the continuation based runtime. Optionally, one or more acts are performed outside of the continuation based runtime as part of the transaction (act 412). At some point in the transaction, an activity is encountered that is to be executed within the continuation based runtime. The application thus provides the activity type to the runtime (act 413) to thereby cause the continuation based runtime to instantiate an activity of the appropriate type. Alternatively, this might happen by having the external application simply signal the workflow through a continuation. That is, the outside does not necessarily need to provide an activity. Rather, the outside can provide continuation values to the already running activity.

Figure 5:
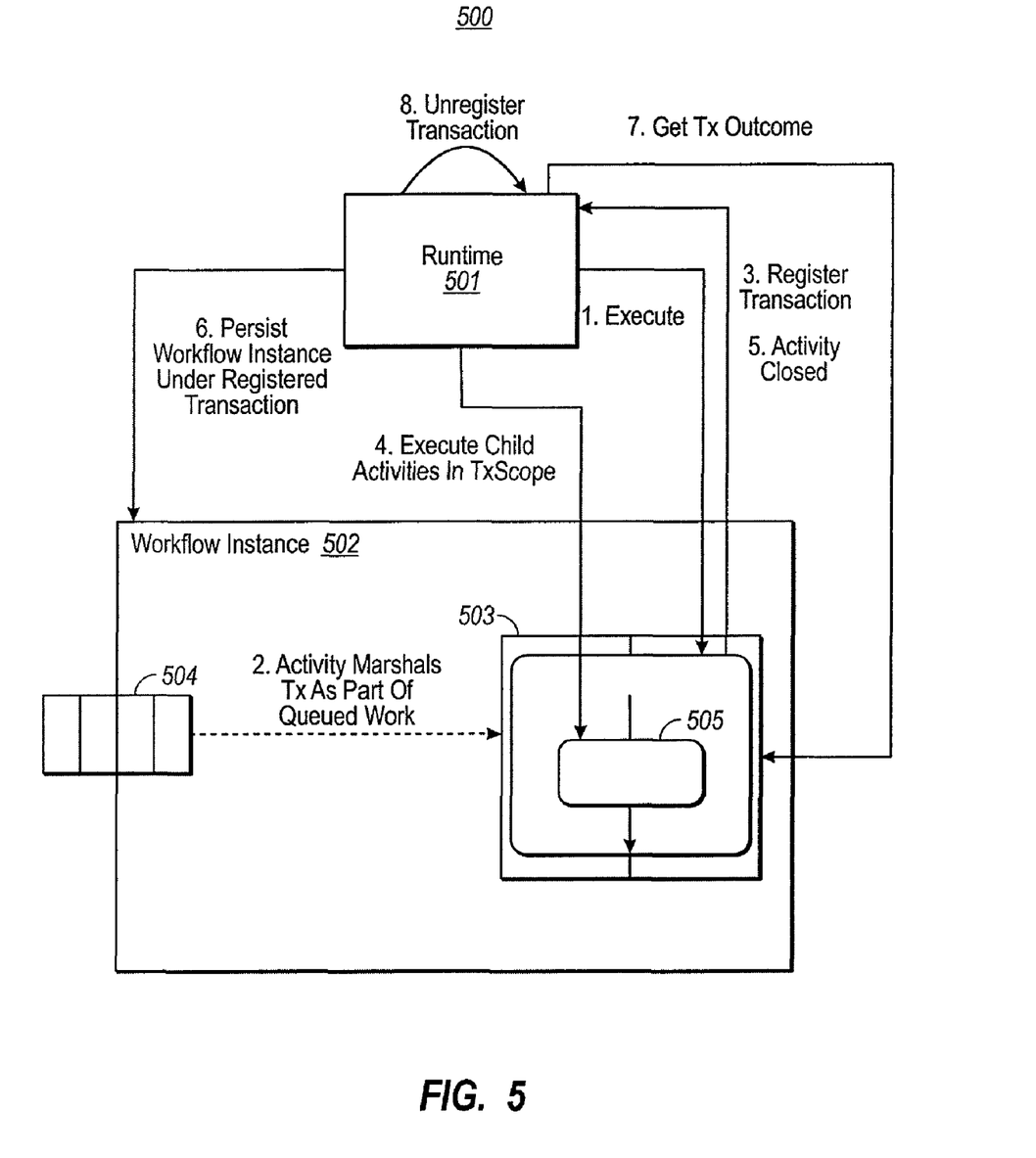
FIG. 5 illustrates an architecture showing various components of the continuation based runtime, and various process flows associated with the performance of a portion of a transaction within the continuation based runtime.

The runtime then executes the corresponding activity instance (act 421). Upon executing this parent activity, or one of its descendent activities, one of the activities may be a transaction enabled activity that that can provide the runtime with a transaction to enlist in. FIG. 5 illustrates an execution architecture 500 that illustrates various components and data flows performed in the method of FIG. 4. The runtime 501 (which may be a continuation based runtime) submits and executes instructions for the activity, causing the activity instance 503 to be generated within a workflow instance 502. Although perhaps agnostic to the runtime 501 at this stage, the activity 503 may, in fact, be a transaction enabled activity that represents a pulse of work (or multiple pulses of work) that is to be performed as part of the transaction that was generated outside of the continuation based runtime.

The workflow instance 502 provides a handle that may be used to perform various actions with regard to the activity 503. Furthermore, the workflow instance 502 may provide basic services to the activity. For example, the workflow instance 502 may permit the runtime 501 to start new activities within the context of the workflow, may provide a queue 504 from which the activity 503 may draw work, and may provide a mechanism for resuming a paused activity. In accordance with one aspect described herein, the workflow instance 502 may also provide a mechanism for the activity to marshal data generated outside the continuation based runtime 501 into the activity 503 running within the runtime 50T.

Returning to the method 400 of FIG. 4, upon execution of the activity (act 421), the activity instance is created, and the activity marshals transaction data into the activity instance (act 431). This may be done by, for example, the workflow instance 502 providing a application program interface allowing the specification of a place where the transaction data may be placed that may also be accessed by the activity 503. The transaction data may include, for example, a transaction object or another component that describes at least some of the state of the transaction, or may be a proxy to the same (such as a transaction identifier). The marshalling of the transaction data is represented as step 2 in FIG. 5.

After potentially some appropriate processing by the activity, the transaction data (or a derivative thereof) is then provided to the continuation based runtime (act 432) in conjunction with a request for the continuation based runtime to enlist in the externally initiated transaction. This request is illustrated as step 3 in FIG. 5.

The continuation based runtime then registers in the transaction (act 422) in response to the request. In conjunction with this registration, in order to provide an appropriate rollback state for use in the contingency that the transaction ultimately fails and must be rolled back, the continuation based runtime preserves a snapshot of its pre-transaction workflow environment (act 423). The registration of the continuation based runtime with the transaction, and the preservation of the pre-transaction workflow environment may be performed using a transaction framework available to the continuation based runtime.

The activity then uses the marshaled transaction data in order to perform an internal portion of the external generated transaction (act 433). As part of this process, the activity may alter the state of one or more transactionally-aware resources, such as perhaps a database, a queue, or any other resources. The transactionally-aware resources are resources that are managed by a transaction framework that permits the state of the resources to be rolled back if the transaction fails, and which guarantees isolation of the resource while it is being altered. The transactionally-aware resources that the activity alters may be all the same, some the same, or all different than the transactionally-aware resources altered by acts performed outside of the continuation based runtime as part of the transaction.

In one embodiment, the activity is executed to thereby perform an internal portion of the transaction (act 433), by executing in proper order some or all of the descendent activities of the activity 503. For instance, referring to FIG. 3, if the activity 503 were the root activity 311, then some or all of the descendent activities 321 through 324, and 331 through 333 may be performed. On the other hand, if the activity 503 were the activity 322, then only the child activities 231 and/or 232 would be performed. Referring to FIG. 5, the runtime 501 controls the execution flow of the child activities as represented by step 4.

When the transaction enabled activity has completed processing, including execution of as many of the child activities 505 as was necessary to complete the activity, the activity notifies to the runtime that it is completed processing (act 434). This is represented in step 5 of FIG. 5.

In response, the continuation based runtime persists a post-transaction environment of the workflow after the activity is complete (act 424). The transaction is not yet complete, as there may be one or more other acts performed outside of the continuation based runtime as part of the transaction. Nevertheless, at this stage, the continuation based runtime has preserved the pre-transaction environment and the post-transaction environment of the workflow.

Outside of the continuation based runtime, optionally one of more other acts may be performed as part of the transaction (act 414). In furthering the transaction, the transaction may once again call upon the services of the continuation based runtime. In that case, the continuation based runtime may proceed substantially as outlined above. However, in this case, a different transaction enabled activity may be executed. In addition, instead of enlisting again for the same transaction, the continuation based runtime may recognize that it has already enlisted in the transaction, and therefore refrain from again providing its per-transaction workflow environment to the transaction framework, since that state has already been provided. Furthermore, when that subsequent activity is completed, the previously persisted post-transaction workflow environment may be replaced by the further altered post-transaction workflow environment. Accordingly, the continuation based runtime may be enlisted as many times as needed as part of the transaction, while still allowing acts of the transaction to be performed outside of the continuation based runtime.

Once the acts of the transaction are completed, the continuation based runtime determines whether or not the transaction is to be committed or rolled back (decision block 425). For instance, if one or more errors occurred during the performance of the transaction, whether those errors occurred inside the continuation based runtime or outside, the transaction framework may decide that the transaction is to be rolled back. The continuation based runtime 501 may inquire of the activity 503 regarding the result of the transaction. This is represented by step 7 in FIG. 5. The activity 503 may know this information by appropriately interfacing with the transaction framework. Alternatively, the continuation based runtime itself may inquire directly to the transaction framework to obtain the transaction result.

If the transaction is to be rolled back ("Roll Back" in decision block 425), the continuation based runtime restores the previous snapshot of the pre-transaction workflow state (act 426). Of course the transaction framework will also make sure that other transactionally-aware resources are also rolled back, although that is outside of the control of the continuation based runtime itself. The continuation based runtime has thus rolled back the workflow environment to its state prior to the transaction thereby contributing to the rolling back of the transaction as a whole. The transaction framework may be used to roll the workflow environment back to this pre-transaction state.

If the transaction is to the committed ("Commit" in decision block 425), the workflow environment state will take on the most recently persisted post-transaction state (act 427). The transaction framework will make sure that the other transactionally-aware resources that were altered as part of the transaction also continue with their post-transaction state.

Regardless of whether the transaction is rolled-back or committed, the continuation based runtime then unregisters in the transaction (act 428), thereby completing the method 400. This unregistering is represented by the step 8 in FIG. 5.

Accordingly, the embodiments described herein present an effective mechanism for a transaction to use the services of a continuation based runtime without requiring the transaction to be created by the continuation based runtime. Therefore, acts that are performed as part of the transaction may be shared by components outside of the continuation based runtime, and by components internal to the continuation based runtime. This allows for effective and flexible composition of transactions thereby bridging across the boundaries of the continuation based runtime in the transactional world.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system a method in which one or more applications manage one or more transactions, each of which includes a plurality of activities to be executed when performing a transaction, and wherein the method provides for flexible composition of a transaction that is to be performed by allowing one or more actions of the transaction that is to be performed to be executed outside of a continuation based runtime, and one or more activities of the same transaction to be executed inside the continuation based runtime, the method comprising the following acts:

initiating at a computing system an application which contains one or more transactions to be performed, with each transaction comprising one or more activities that require execution in order for the transaction to be completed;

initiating at the computing system a continuation based runtime;

initiating outside of the continuation based runtime a transaction of the application;

performing one or more activities of the initiated transaction prior to enlisting service of the continuation based runtime;

while performing the one or more activities of the initiated transaction outside of the continuation based runtime, encountering an activity that is to be executed within the continuation based runtime; and providing the encountered activity to the continuation based runtime and executing the encountered activity within the continuation based runtime.

2. A method as defined in claim 1, wherein the method is implemented by executable instructions stored on one or more computer-readable media comprised of physical memory.

3. A method as defined in claim 1 further comprising acts of:

marshalling transaction data for the initiated transaction, the transaction data being provided to the activity executing within the continuation based runtime; and the continuation based runtime using the marshaled data to execute the activity within the continuation based runtime as a way of performing a portion of the initiated transaction.

4. A method as defined in claim 1, wherein the one or more activities of the initiated transaction interface with a set of one or more transactionally-aware resources.

5. A method as defined in claim 1 wherein the encountered activity is hierarchal and wherein executing the encountered activity within the continuation based runtime comprises executing a plurality of child activities of the encountered hierarchal activity.

6. A method as defined in claim 3, wherein marshalling transaction data comprises:

an act of creating the transaction data; and an act of using a pre-determined application program interface to specify where to place the transaction data.

7. In a computing system a method in which one or more applications manage one or more transactions, each of which includes a plurality of activities to be executed when performing a transaction, and wherein the method provides for flexible composition of a transaction that is to be performed by allowing one or more actions of the transaction that is to be performed to be executed outside of a continuation based runtime, and one or more activities of the same transaction to be executed inside the continuation based runtime, the method comprising the following acts:

initiating at a computing system an application which contains one or more transactions to be performed, with each transaction comprising one or more activities that require execution in order for the transaction to be completed;

initiating at the computing system a continuation based runtime;

initiating outside of the continuation based runtime a transaction of the application;

performing one or more activities of the initiated transaction prior to enlisting service of the continuation based runtime;

while performing the one or more activities of the initiated transaction outside of the continuation based runtime, encountering an activity that is to be executed within the continuation based runtime;

executing the encountered activity within the continuation based runtime; and providing to the continuation based runtime a request from the encountered activity to register in the initiated transaction, and the continuation based runtime enlisting in the initiated transaction.

8. A method in accordance with claim 7, wherein, prior to the continuation based runtime registering in the transaction, the method is comprised of the further acts of:

marshalling transaction data for the initiated transaction, the transaction data being provided to the activity executing within the continuation based runtime; and providing the initiated transaction or at least a proxy to the transaction to the continuation based runtime associated with the request to register in the transaction.

9. A method in accordance with claim 7, further comprising:

an act of the continuation based runtime preserving a pre-transaction environment of a workflow encompassing the activity executed within the continuation based runtime in conjunction with the act of registering in the initiated transaction.

10. A method in accordance with claim 9, further comprising:

an act of the continuation based runtime persisting a post-transaction environment of the workflow after the activity executed within the continuation based runtime is complete.

11. A method in accordance with claim 10, further comprising:

an act of the continuation based runtime determining whether or not the initiated transaction, including all of the one or more activities of the initiated transaction performed prior to enlisting service of the continuation based runtime, is to be committed.

12. A method in accordance with claim 11, further comprising:

an act of the continuation based runtime rolling back the environment of the workflow to the pre-transaction environment upon determining that the initiated transaction is not to be committed.

13. A method in accordance with claim 11, further comprising:

an act of the unregistering in the initiated transaction upon determining that the initiated transaction is to be committed.

14. A method as defined in claim 8, wherein the marshaled data is used by the continuation based runtime to execute the encountered activity and wherein executing the encountered activity causes one or more child activities of the encountered activity to be executed.

15. A method as defined in claim 14, wherein the execution of the one or more child activities causes one or more transactionally-aware resources to be altered.

16. A method as defined in claim 7, wherein the method is implemented by executable instructions stored on one or more computer-readable media comprised of physical memory.

* * * * *